United States Patent [19]

Summers

[11] 4,118,346
[45] Oct. 3, 1978

[54] PHENOLIC RESIN RECOVERY PROCESS
[75] Inventor: Robert Milton Summers, Southfield, Mich.
[73] Assignee: The Bendix Corporation, Southfield, Mich.
[21] Appl. No.: 864,350
[22] Filed: Dec. 27, 1977
[51] Int. Cl.² .................. B29H 19/00; C08J 11/04
[52] U.S. Cl. .................. 260/2.3; 260/32.8 R; 260/33.4 R; 260/38; 528/130; 528/133; 528/481; 528/493; 528/495
[58] Field of Search .............. 260/2.3, 59 R, 60, 57 R

[56] References Cited
U.S. PATENT DOCUMENTS

| 2,851,433 | 9/1958 | Booty | 260/59 R X |
| 4,067,854 | 1/1978 | Fiorentino | 260/59 R X |

OTHER PUBLICATIONS
Chem. Abstracts, vol. 55, 1959, 19076d–19076e, Urlina.
Chem. Abstracts, vol. 85, 1976, 130146t, Ruff et al.

*Primary Examiner*—Howard E. Schain
*Attorney, Agent, or Firm*—Leo H. McCormick, Jr.; Ken C. Decker

[57] ABSTRACT

A method of recovering a resin material from an infusible phenolic plastic composition. The infusible phenolic plastic composition is ground to a powder and mixed with an alkali solution to produce a liquid mixture. The liquid mixture is heated to a temperature selected between 260°–340° C and maintained at this temperature between 160 and 3 minutes causing the resin in the infusible phenolic plastic composition to dissolve in the alkali solution and produce a liquor. Thereafter the liquor is passed through a filter to remove any insoluble plastic composition therefrom. An acid solution when added to the filtered liquor causes a solid to precipitate from the liquor. The solid is separated from the liquor and washed in a water bath to remove any water soluble salts, phenols, and cresols from the recovered resin material.

10 Claims, No Drawings

PHENOLIC RESIN RECOVERY PROCESS

BACKGROUND OF THE INVENTION

Thermosetting phenolic resins are created through a condensation reaction between phenol and formaldehyde in the presence of heat and an acid or base catalyst. Because thermoset phenolic resins are both infusible and insoluble to most chemicals they are generally used as chemical and heat resistant binders for molded resin products, adhesives and coatings. Unfortunately, during most manufacturing processes, as much as 5 percent of these thermoset phenolic resins end up as waste. Currently such waste is generally discarded as landfill. Since both phenol and formaldehyde are derivatives of petroleum and natural gas, whose availability has decreased recently, the cost of such waste has restricted the availability of these thermosetting resins. However, if the phenolic resin in such waste could be recovered, a significant supplement source of resin materials would be available for reuse.

SUMMARY OF THE INVENTION

I have developed a process of recovering a resin type material from infusible phenolic resins through the following steps:

A quantity of infusible phenolic resin was ground into a powder and placed in a container. A dilute alkali solution was added to the powder to produce a uniform mixture. Thereafter, the container was sealed and heated to a temperature of between 260°-340° C for a time period of between 160 and 3 minutes causing at least a portion of the infusible phenolic resin to dissolve in the alkali solution and produce a liquor. The liquor was passed through a filter to remove any insoluble components of the infusible phenolic resin therefrom. Thereafter an acid solution was added to the liquor causing a solid to precipitate. The solid was removed from the liquor and washed in a water bath to remove any water soluble salts, phenols, and cresols while a resin type material remained. This resin type material was dried and stored for later use. Later when this resin type material was reacted with an acid or base catalyst and formaldehyde or hexamethylenetetramine in the presence of heat, an infusible and insoluble material was produced.

It is the object of this invention to provide a process of recovering a reuseable phenolic resin type material from an infusible phenolic plastic.

It is a further object of this invention to provide a process for recovering a novolac phenolic composition from a cured phenolic resin.

It is another object of this invention to provide a method of recovering a novolac resin from a cured phenol-formaldehyde resin through alkaline hydrolysis.

These and other objects of this invention should be apparent from reading this specification.

DETAILED DESCRIPTION OF THE INVENTION

Thermosetting phenolic resins are made by a condensation reaction of phenol and formaldehyde in the presence of heat. Since these phenolic resins are resistant to degradation by acids and alkaline solution they have been widely used as heat resistant binders for such products as brake linings, electrical resistors, sewer pipes, and other molded products. Currently, cured phenolic resin waste created during the manufacture of such products has little value as a recyclable material. Recovery of novolac resins from such cured resin waste would be an ecological benefit since such waste is usually discarded in landfills.

Through experimentation it was discovered that cured phenolic resins could be regenerated to curable thermosetting resin type material through alkaline hydrolysis at temperatures between 280°-320° C.

In order to evaluate the efficacy of this recovery process, a series of resin compositions, having controlled ingredients as listed in Table I were known were made up, cured, and a resin type material recovered therefrom in the following manner:

TABLE 1

| Composition | Ingredients | | Weight % |
|---|---|---|---|
| A | φ | Phenolic Resin A | 100 |
| B | φφ | Phenolic Resin B | 100 |
| C | φφφ | Phenolic Resin C | 100 |
| D | φ | Phenolic Resin A | 17.9 |
| | * | Mineral Filler | 66.0 |
| | ** | Organic Filler | 16.1 |
| E | φφ | Phenolic Resin B | 11.0 |
| | * | Mineral Filler | 57.4 |
| | ** | Organic Filler | 31.6 |
| F | φφφ | Phenolic Resin C | 19.0 |
| | * | Mineral Filler | 66.6 |
| | ** | Organic Filler | 14.4 |

φ Phenolic Resin A was derived through a reaction of a novolac resin with 9% hexamethylenetetramine (hexa) in the presence of an acid catalyst. Resin A is both fusible and soluble in solvents such as dilute sodium hydroxide, alcohols, ketones, acetones, etc.
φφ Phenolic Resin B was derived through a reaction of an epoxy-modified phenolic with 9% hexamethylenetetramine in the presence of an acid catalyst. Resin B is both fusible and soluble in solvents such as dilute sodium hydroxide, alcohols, ketones, acetones, etc.
φφφ Phenolic Resin C was derived through a reaction of an oil modified phenolic with 6.5% of hexamethylenetetramine in the presence of an acid catalyst. Resin C is both fusible and soluble in solvents such as dilute sodium hydroxide, alcohols, ketones, acetones, etc.
* The mineral fillers can include any or all of the following in any combination: asbestos, graphite, carbon particles, barytes, whiting, talc, rottenstone, silica, alumina, cashew nut dust, etc.
** The organic fillers can include any or all of the following in any combination: natural and synthetic rubber scraps, latex, crude molasses, asphaltic base materials, etc.

Compositions A-F were placed in separate containers and cured by heating in an oven at 200° C for 3-4 hours. Each cured resin composition was then ground to pass a 40 mesh screen. Each of the compositions A-F possessed the following characteristics: hard, brittle, and an infusible solid which were insoluble in a dilute alkali solution, boiling acetone, chloroform, benzene, and tetrahydrofuran.

To verify the isolubility of the cured compositions A, B and C, each composition was weighed and thereafter placed in separate acetone baths for a period of about 16 hours. Compositions A, B and C were reweighed and the difference in weight indicated that over 97% of the phenolic resin in compositions A and B and over 95% of the phenolic resin in composition C had cured into an insoluble material which is considered normal for most commercial resins. An acetone extraction process on compositions D, E, and F gave similar results.

The following examples illustrate the regenerative process of this invention.

EXAMPLE 1

A mixture of 32 g of composition A and 700 ml of 5% sodium hydroxide solution were mixed together in a 2l high pressure autoclave, equipped with a mechanical stirrer. The autoclave was sealed and heated to 300° C and held at this temperature for a 6 minute time period. Thereafter the mixture was quickly cooled to room temperature. The mixture was filtered through a sintered glass filter to produce a filtrate. The insoluble residue which amounted to less than 0.1 g was washed with water and the rinse water added to the filtrate. The filtrate was acidified to a pH 3.5 with dilute sulphuric acid causing a resin precipitate to form. The resin precipitate was collected on a second filter and rinsed with water several times and dried. The yield of recovered dried resin precipitate, which had a tan color, was 25.6 g or 80% of the original weight of the cured resin. The resin precipitate melted over a temperature range of 133°–146° C.

EXAMPLE 2

The procedure of Example 1 was repeated substituting 32 g of composition B in place of composition A. The amount of alkali insoluble material remaining after 6 minutes reaction at 300° C and cooling to room temperature was 0.3 g. The insoluble material was removed by filtration and a recovered novolac resin precipitated from the filtrate by the addition of dilute sulphuric acid to pH 3.5. The yield of dried resin precipitate which melted over a temperature range of 102°–114° C, was 25.6 g or 80% of the original weight of the cured resin.

EXAMPLE 3

The procedure of Example 1 was repeated substituting 32 g of composition C in place of composition A. The alkali insoluble residue amounted to 0.4 g and the dried recovered resin precipitate obtained on acidification of the filtrate to pH 3.5 amounted to 25.7 g or 80.3% of the original cured resin. This resin precipitate melted over a temperature range of 85°–91° C.

EXAMPLE 4

A slurry consisting of 200 g of compositon D and 700 ml of 3.3% sodium hydroxide solution in water were mixed together and placed in the 2 1 autoclave. The autoclave was sealed and heated while stirring to a temperature of 300° C. After 3 minutes at 300° C, the autoclave and the mixture was quickly cooled to room temperature. The reaction mixture was filtered to remove the insoluble material. The insoluble material was washed several times with water and the washings were added to the main filtrate. The combined filtrate and washings were acidified to pH 3.5 with dilute sulfuric acid, causing a resin precipitate to form. The resin precipitate was collected on a second filter, washed and dried. The dried resin precipitate amounted to 27.7 g or 77.4% of the theoretical phenolic resin content of composition D. This resin precipitate melted over a temperature range of 174°–182° C.

EXAMPLE 5

The procedure of Example 4 on composition D was repeated except the reaction time at 300° C in the alkali solution was extended to 5 minutes. Yield of the recovered resin precipitate which melted over a temperature range of 163°–178° C, was 27.0 g or 75.5% of the theoretical resin content of composition D.

EXAMPLE 6

The procedure of Example 4 on composition D was repeated except reaction time at 300° C in the alkali solution was extended to 10 minutes. Yield of recovered resin precipitate amounted to 26.2 g or 72% of the resin content of composition D. This resin precipitate had a melting temperature between 125°–142° C.

EXAMPLE 7

The procedure of Example 4 on composition D was repeated except reaction time at 300° C in the alkali solution was extended to 15 minutes. The yield of recovered resin precipitate amounted to 27.6 g or 77% of the resin content of the composition D. This resin precipitate had a melting temperature between 135°–152° C.

EXAMPLE 8

The procedure of Example 4 was repeated using 100 g of composition F in place of composition D and the 3.3% sodium hydroxide in the mixture was reduced to 450 ml. This mixture was heated at 300° C for 10 minutes and then cooled. The yield of recovered resin precipitate amounted to 25.5 g or 71.2% of the resin content of the composition F. This resin precipitate had a melting temperature between 93°–110° C.

EXAMPLE 9

The procedure of Example 4 was repeated using 100 g of composition E in place of composition D and 450 ml of 3.3% sodium hydroxide and 10 minutes at 300° C. The yield of recovered novolac resin precipitate amounted to 27.2 g or 76% of the theoretical resin content of composition E. This novolac resin precipitate had a melting temperature between 106°–124° C.

The recovered novolac resin type material obtained from compositions A, B, C, D and E possessed the following characteristics: the solid resin type material had a color varying from tan to dark brown with an amorphous shape which melted from a solid to a liquid when heated between 80° and 186° C. The resin precipitates were soluble in acetone, isopropanol, methyl ethyl ketone, tetrahydrofuran and the cellosolves; partially soluble in methanol and denatured ethanol; and insoluble in aromatic, aliphatic and chlorinated solvents. When each of these solid resins were melted they fused into a dark brown continuous film which when cooled proved to be soluble in acetone to form dark colored solutions. Each of these recovered novolac resins fused and cured into an insoluble and infusible mass when ground with 10% hexamethylenetetramine and heated above 150° C. The cured resin type materials were essentially indistinguishable from the initially cured resin in compositions A, B and C. This similarity was verified by comparing infrared scans of the recovered resin type materials with the phenolic novolac resin in composition A.

The molecular weights ($\overline{Mw}$) of the recovered resin type materials varied from 1300 to 3100. Shorter reaction time favored higher $\overline{Mw}$ and higher Lowry index. Longer reaction time reduced both molecular weight and the Lowry index as illustrated in Table 11a. The molecular weights of the recovered resin are generally lower and the molecular weight distributions are narrower than those of the corresponding commercial resins made by the conventional phenol-formaldehyde condensation as illustrated in Table 11b.

TABLE IIa

| | | | Phenolic Resin Recovery at 300° C | | | | |
|---|---|---|---|---|---|---|---|
| Example | Reaction Temp. (° C) | Reaction Time (min) | Resin Recovery (%) | Melting Range (° C) | Molecular weight Mw | Mn | Lowry Index |
| 1 | 300 | 6 | 80 | 136–146 | 1300 | 635 | 1.07 |
| 2 | 300 | 6 | 80 | 102–114 | 3128 | 694 | 1.87 |
| 3 | 300 | 6 | 80 | 81– 95 | 1980 | 600 | 1.52 |
| 4 | 300 | 3 | 77.4 | 175–186 | 2637 | 779 | 1.55 |
| 5 | 300 | 5 | 75.5 | 163–178 | 2157 | 711 | 1.40 |
| 6 | 300 | 10 | 73.2 | 125–142 | 1435 | 555 | 1.26 |
| 7 | 300 | 15 | 77.1 | 135–152 | 1454 | 547 | 1.29 |
| 8 | 300 | 10 | 71.2 | 93–110 | — | — | — |
| 9 | 300 | 10 | 76 | 106–124 | — | — | — |

TABLE IIb

| Composition | Melting Range (° C) | Molecular weight Mw | Mn | Lowry Index |
|---|---|---|---|---|
| Phenolic Resin A | 70–92 | 8490 | 1280 | 2.36 |
| Phenolic Resin B | 75–85 | 5270 | 920 | 2.17 |
| Phenolic Resin C | 65–84 | 8510 | 1010 | 2.64 |

In order to establish limits for the optimum operation of the process, samples of composition D, whose ingredients are listed in Table I, were evaluated by varying both time and temperature.

In this evaluation, a quantity of composition D was ground to a powder which passed a 20 mesh screen and 17 lg samples obtained. Each sample was placed in a stainless steel tube (8 ml capacity) and 3.5 ml of dilute (3%) sodium hydroxide solution added thereto and the tube sealed. The following examples illustrate the results of this evaluation.

EXAMPLES 10–13

Four sealed tubes were placed in a silicone oil-bath having a constant temperature of 260° C. Thereafter, the samples were removed at the following intervals: 1 sample was removed at 20 minutes, 1 sample removed at 40 minutes, 1 sample was removed at 80 minutes and the last sample removed at 160 minutes. The tubes were cooled to room temperature, opened and contents of each tube treated separately in the following way. The liquid mixture was filtered to remove any insoluble material. The insoluble residue was washed with distilled water and the filtered washings added to the main filtrate. A dilute acid (sulfuric) solution was added to the filtrate to precipitate a solid resin type material. The resin type material was collected, washed, air dried, and weighed. The weight of the recovered phenolic resin type material was compared to the weight of the original phenolic resin in composition D and the recovery percentages listed in Table III.

EXAMPLES 14–17

The procedure in Examples 10–13 was repeated except the tubes were placed in a silicone oil-bath having a constant temperature of 280° C and removed at 10, 20, 80 and 160 minute intervals. The recovery results are listed in Table III.

EXAMPLES 18–22

The procedure in Examples 10–13 was repeated except the tubes were placed in a silicone oil-bath having a constant temperature of 300° C and removed at 10, 20, 40, 80 and 160 minute intervals. The yields of recovered resin precipitate are given in Table III.

EXAMPLES 23–26

The procedure in Examples 10–13 was repeated except the tubes were placed in a silicone oil-bath having a constant temperature of 320° C and were removed at 10, 20, 40 and 80 minute intervals. The yield of recovered resin precipitate from this series of examples are also given in Table III.

From the experiments performed on these 17 samples it was found that an increase in temperature of the alkali solution in which the cured resin composition was degraded reduced the time required to recover the novolac type resin materials therein. It would appear that a maximum recovery rate for the novolac resin type material occurs when the reaction time is about 5 minutes and the temperature is at about 300° C. However, as illustrated in Table III, the projected recovery rate for this process is dependent upon both time and temperature.

TABLE III

| | The Effects of Time and Temperature on Resin Recovery | | |
|---|---|---|---|
| Example | Reaction Temp. (° C) | Reaction Time (min) | Resin Recovery (%) |
| 10 | 260 | 20 | 39 |
| 11 | " | 40 | 55 |
| 12 | " | 80 | 61 |
| 13 | " | 160 | 72 |
| 14 | 280 | 10 | 53 |
| 15 | " | 20 | 78 |
| 16 | " | 80 | 67 |
| 17 | " | 160 | 55 |
| 18 | 300 | 10 | 78 |
| 19 | " | 20 | 67 |
| 20 | " | 40 | 51 |
| 21 | " | 80 | 33 |
| 22 | " | 160 | 31 |
| 23 | 320 | 10 | 61 |
| 24 | " | 20 | 39 |
| 25 | " | 40 | 22 |
| 26 | " | 80 | 16 |

I claim:

1. A process for recovering a resin type material from an infusible phenolic plastic, comprising the steps of:
    placing a quantity of said infusible phenolic plastic in a container;
    adding an alkali solution to said infusible phenolic plastic to create a mixture;
    heating said mixture to a temperature between 260°–340° C causing at least a portion of said infusible phenolic plastic to dissolve into said alkali solution to create a liquor;
    filtering said liquor from said mixture to remove any undissolved infusible phenolic plastic and other insoluble materials therefrom; and
    acidifying said liquor by adding an acid solution thereto causing a phenolic type resin material therein to precipitate therefrom as a solid.

2. The process, as recited in claim 1, further including the step of:
    filtering said acidified liquor to remove the solid resin type material therefrom.

3. The process, as recited in claim 2, further including the step of:

washing said solid resin material with water to remove any water soluble salts, phenols, and cresols therefrom to purify said resin type material.

4. The process, as recited in claim 3, further including the step of:

drying said resin type material to remove water therefrom.

5. The method, as recited in claim 4, further including the step of:

maintaining said temperature of said mixture between said 260°–340° C for a time period of between 160 to 3 minutes to assure the optimum recovery of said resin type material from the infusible phenolic plastic.

6. The process, as recited in claim 5, further including the step of:

sealing said container during said heating step to reduce the time required to develop said liquor.

7. The product produced from the process recited in claim 6.

8. A process for the recovery of a novolac type resin material from an infusible phenolic resin composition containing mineral and organic fillers comprising the steps:

grinding a quantity of said infusible phenolic resin composition to a powder;

placing said powder phenolic resin composition in a container;

adding an alkali solution to said container;

stirring said alkali solution and said powder phenolic resin composition together to create a substantially uniform liquid mixture;

heating said liquid mixture to a temperature of between 260°–340° C in a selected time period of between 160 to 3 minutes causing at least a portion of said infusible phenolic resin composition to dissolve into said alkali solution and create a liquor;

passing said liquor through a first filter to remove any undissolved infusible phenolic resin therefrom; and adding an acid solution to said filtered liquor causing a novolac type resin to precipitate therefrom as a solid.

9. The process, as recited in claim 8, further including the steps of:

separating said solid from the acidified liquor by retaining the solid on a second filter; and washing said solid retained on the second filter in a water bath to remove any water soluble salts, phenols and cresols therefrom to purify said novolac type resin.

10. The process, as recited in claim 9, further including the steps of:

maintaining said temperature of the liquid mixture between said 260°–320° C for a time period of between 160 to 3 minutes; and selecting an optimum temperature and time period to reduce any reaction of the alkali solution on any novolac type resin material dissolved therein and thereby prevent any further degradation of the novolac type material in the alkali solution.

* * * * *